March 13, 1962     E. W. LARSEN     3,024,815
APPARATUS FOR FORMING AND HANDLING WIRE PARTS
Filed March 3, 1958     7 Sheets-Sheet 1

INVENTOR
E.W. LARSEN
BY C.B. Hamilton
ATTORNEY

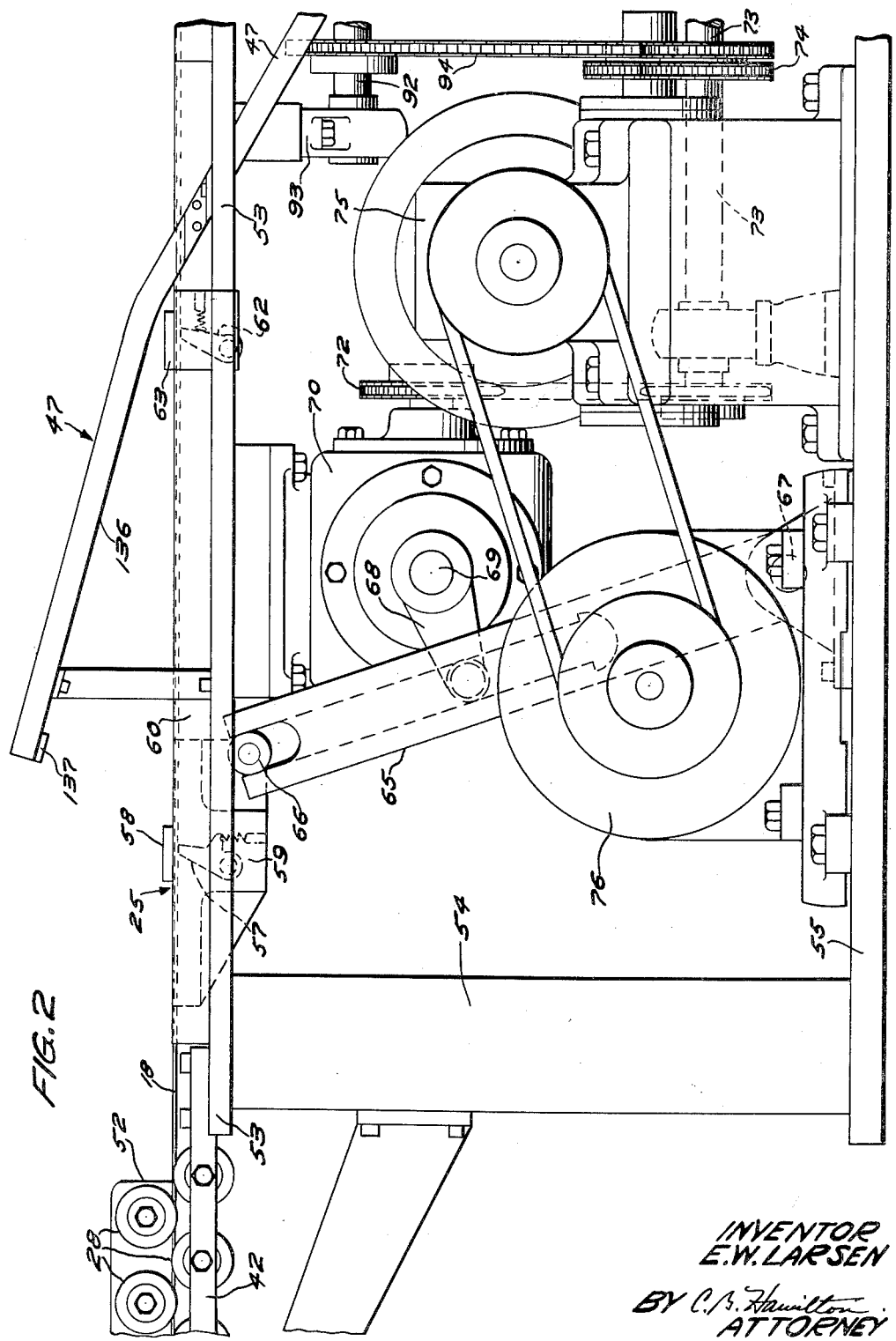

March 13, 1962 E. W. LARSEN 3,024,815
APPARATUS FOR FORMING AND HANDLING WIRE PARTS
Filed March 3, 1958 7 Sheets-Sheet 3
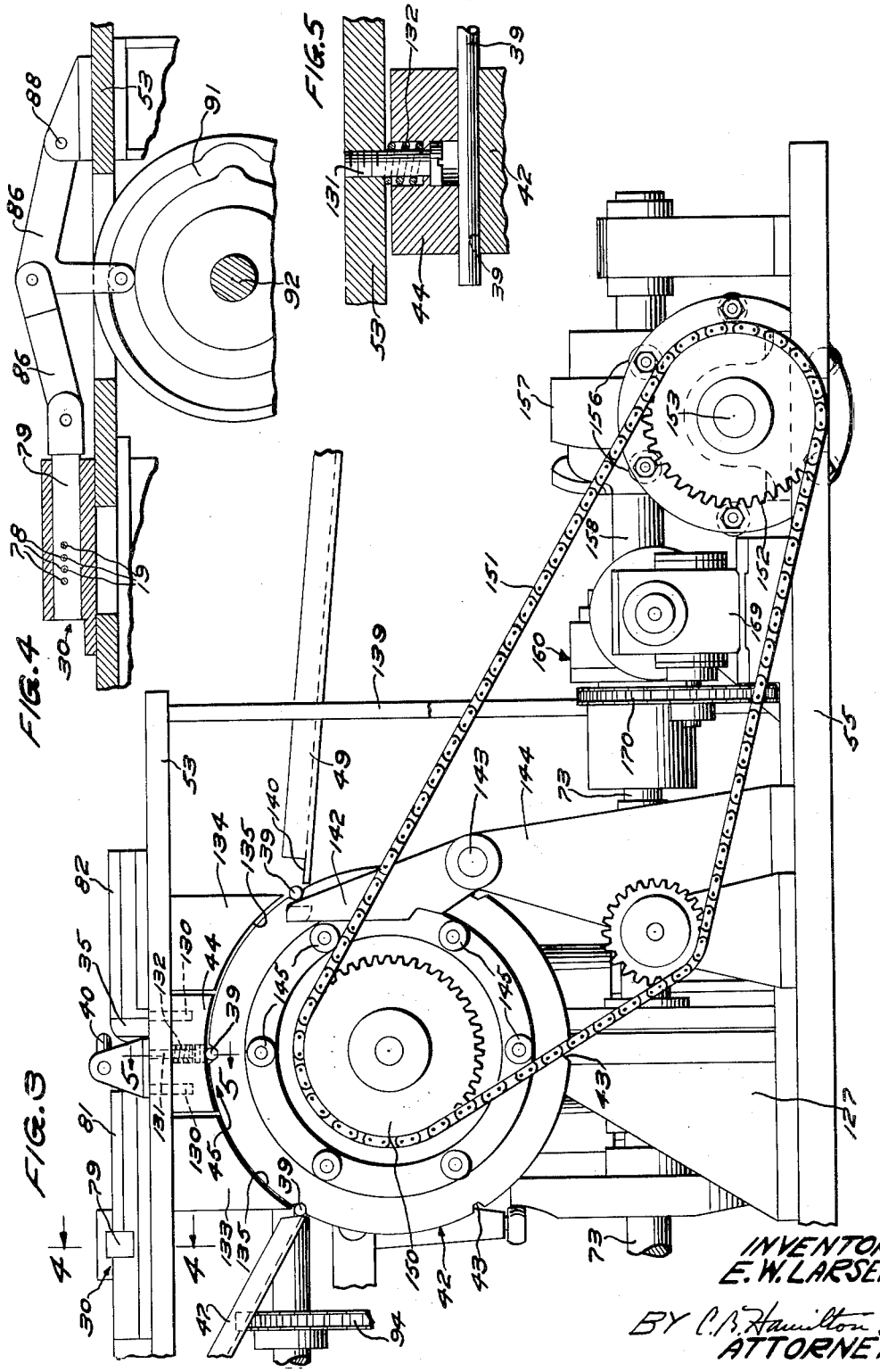
INVENTOR
E. W. LARSEN
BY C. B. Hamilton
ATTORNEY

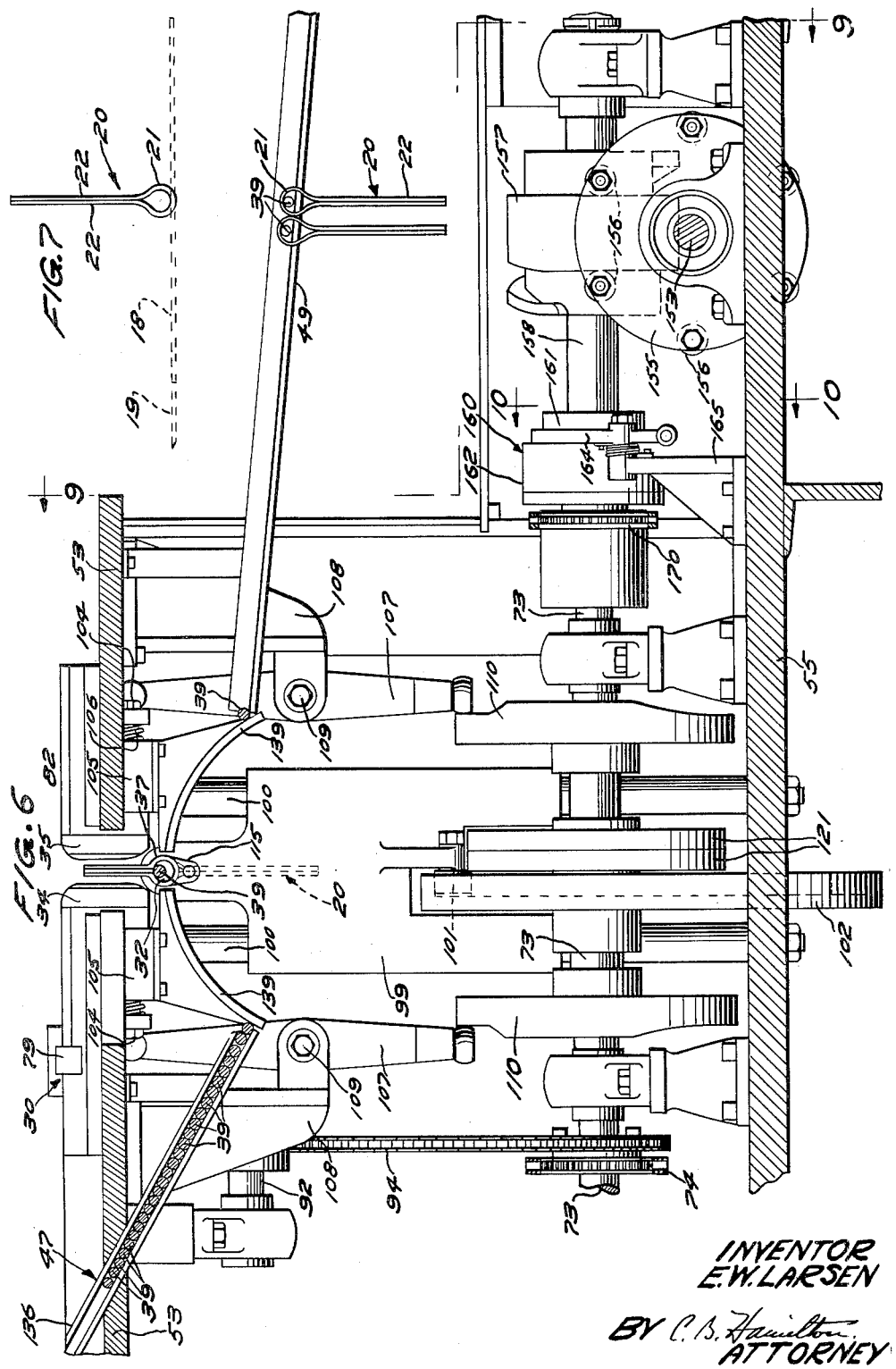

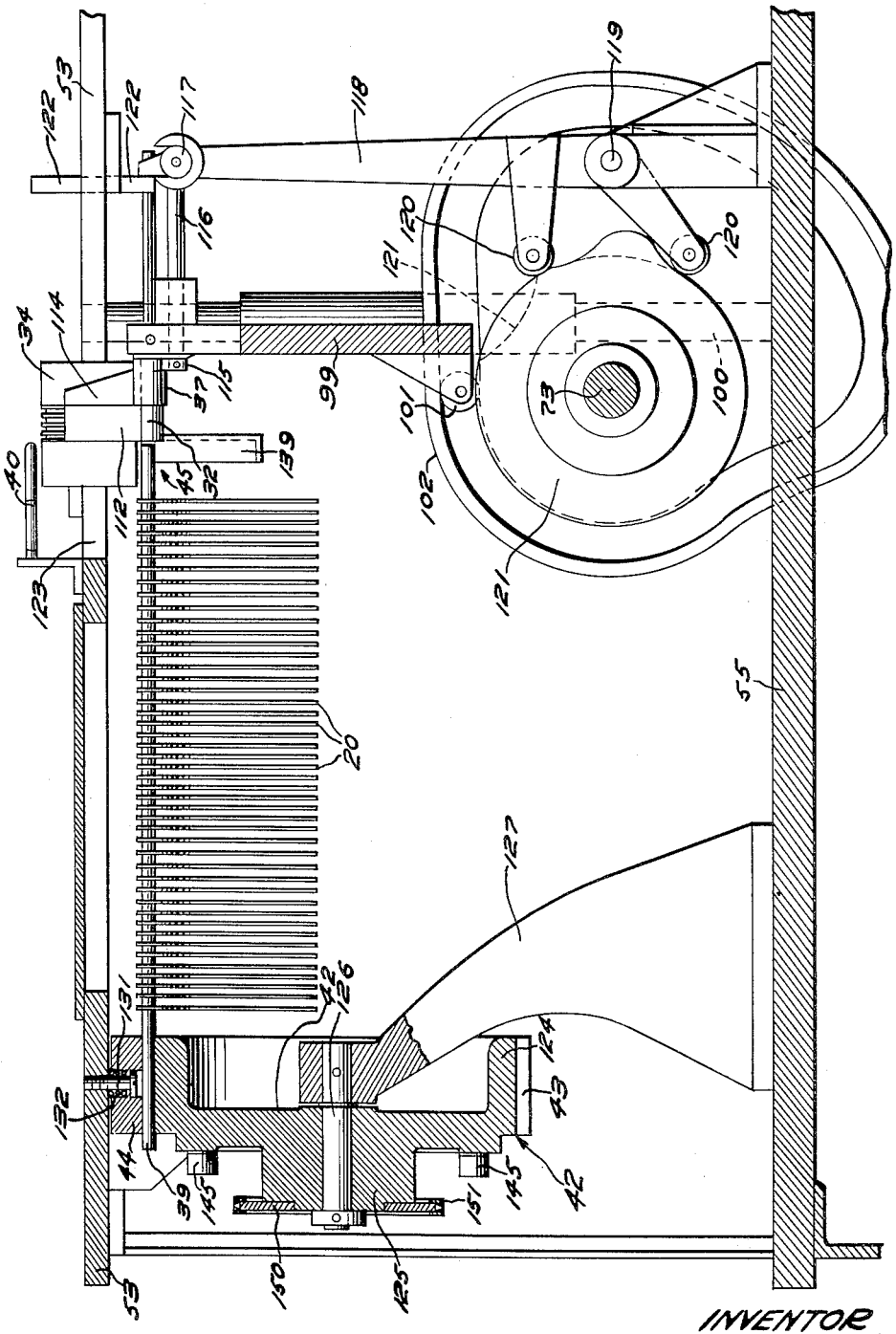

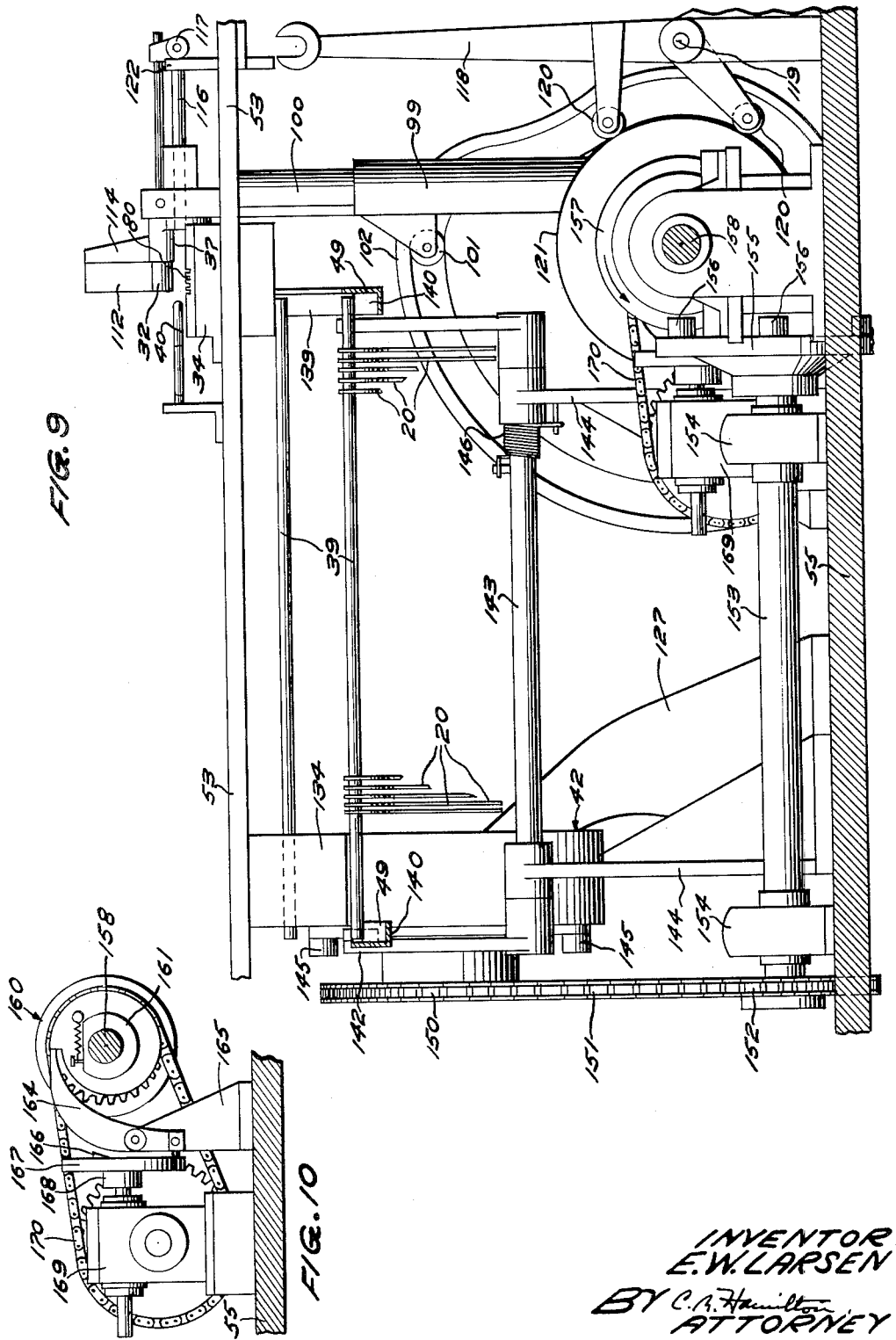

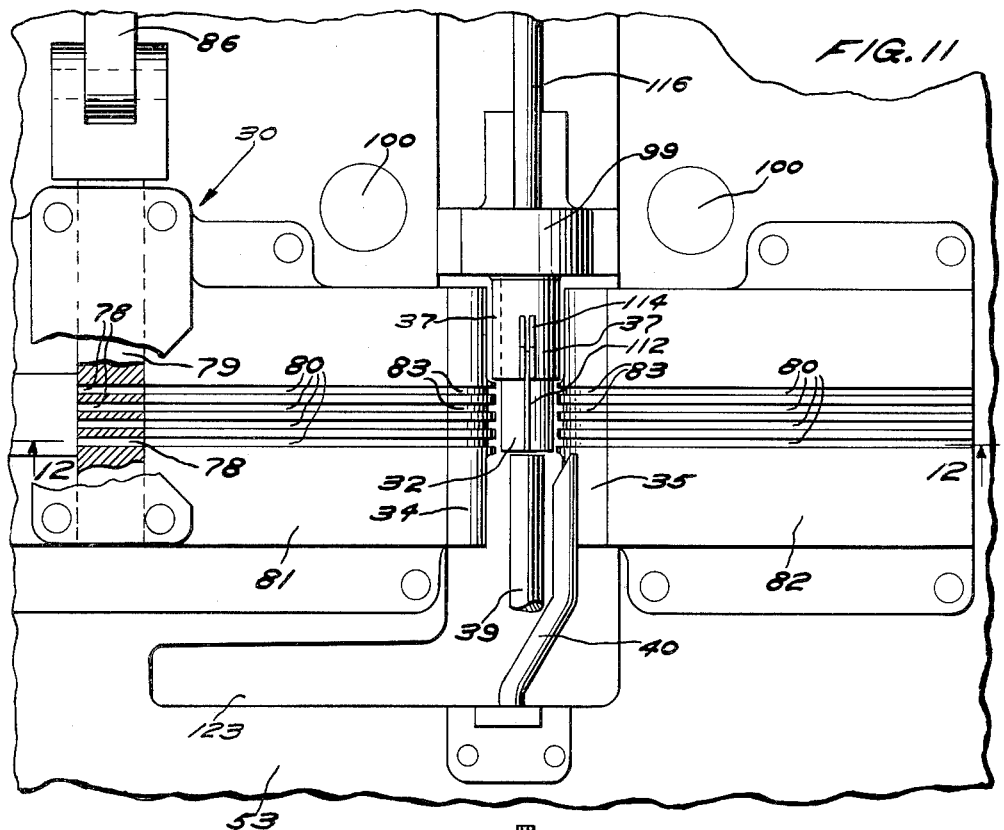
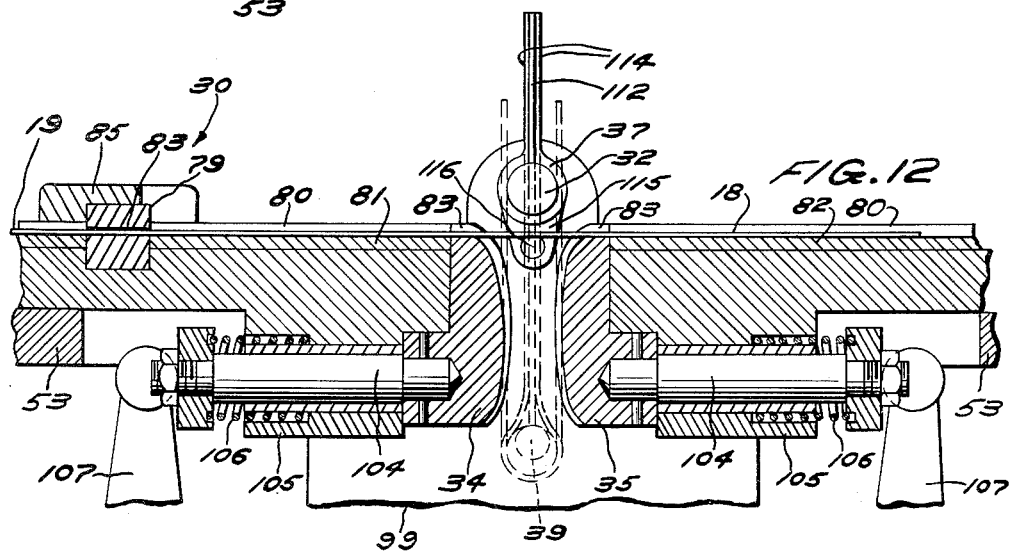

United States Patent Office 3,024,815
Patented Mar. 13, 1962

3,024,815
APPARATUS FOR FORMING AND HANDLING
WIRE PARTS
Einer W. Larsen, Palatine, Ill., assignor to Western Electric Company, Incorporated, New York, N.Y., a corporation of New York
Filed Mar. 3, 1958, Ser. No. 718,895
6 Claims. (Cl. 140—71)

This invention relates to apparatus for forming and magazining wire parts and more particularly to an apparatus for severing successive sections of wire, forming them into parts of predetermined shape, and storing the parts on portable rods.

An object of the invention is to provide an improved apparatus for severing successive sections of a wire and forming them into parts of predetermined shape.

Another object of the invention is to provide an efficient and effective machine for forming and ejecting wire parts and for automatically supplying elements for receiving and storing the ejected parts.

A further object of the invention is the provision, in an apparatus for forming articles and ejecting them onto portable storage elements at a predetermined station, of mechanism for feeding empty storage elements to the ejecting station, supporting them there while a predetermined number of articles are ejected thereonto, and transferring the loaded storage elements to a storage rack.

With these and other objects in view, the invention contemplates intermittently feeding a plurality of wires through a predetermined distance to advance end portions thereof past a cutter and to position them below an arbor and above a pair of spaced dies, actuating the cutter to sever sections of the wire, lowering the arbor to push the wire sections between the dies to bend them into U-shape, moving the dies toward each other to further bend the U-shaped wires around the arbor to a predetermined shape, and then ejecting the formed wires onto a portable storage element in the form of a rod. A hopper is provided for holding a supply of rods and guiding the rods into engagement with a rotary carrier which cooperates with a clamping means to grip the rods at one end and support them horizontally, and the carrier is intermittently indexed to move successive rods to the ejecting station for receiving a predetermined number of the articles, and to move the rods with the articles thereon from the ejecting station onto a rack for storing them.

Other objects and advantages of the invention will become apparent by reference to the following detailed description thereof and the accompanying drawings illustrating a preferred embodiment of the invention, wherein FIG. 1 is a plan view of the apparatus embodying the present invention for forming and magazining wire parts;

FIGS. 2 and 3 are enlarged fragmentary complementary front elevational views of the apparatus shown in FIG. 1;

FIG. 4 is a fragmentary vertical cross sectional view of the wire cut-off mechanism of the apparatus taken on the line 4—4 of FIG. 1;

FIG. 5 is a fragmentary vertical cross sectional view of a portion of the rod-supporting mechanism taken on the line 5—5 of FIG. 3;

FIG. 6 is a fragmentary vertical longitudinal sectional view of the apparatus taken on the line 6—6 of FIG. 1;

FIG. 7 is a view of the wire article formed by the apparatus;

FIG. 8 is a vertical cross sectional view of the apparatus taken on the line 8—8 of FIG. 1;

FIG. 9 is a vertical cross sectional view of the apparatus taken on the line 9—9 of FIG. 6;

FIG. 10 is a fragmentary cross sectional view of a portion of the drive for the apparatus taken on the line 10—10 of FIG. 6;

FIG. 11 is an enlarged fragmentary plan view of the apparatus; and

FIG. 12 is a fragmentary vertical sectional view of the apparatus taken along line 12—12 of FIG. 11.

Figure 1:
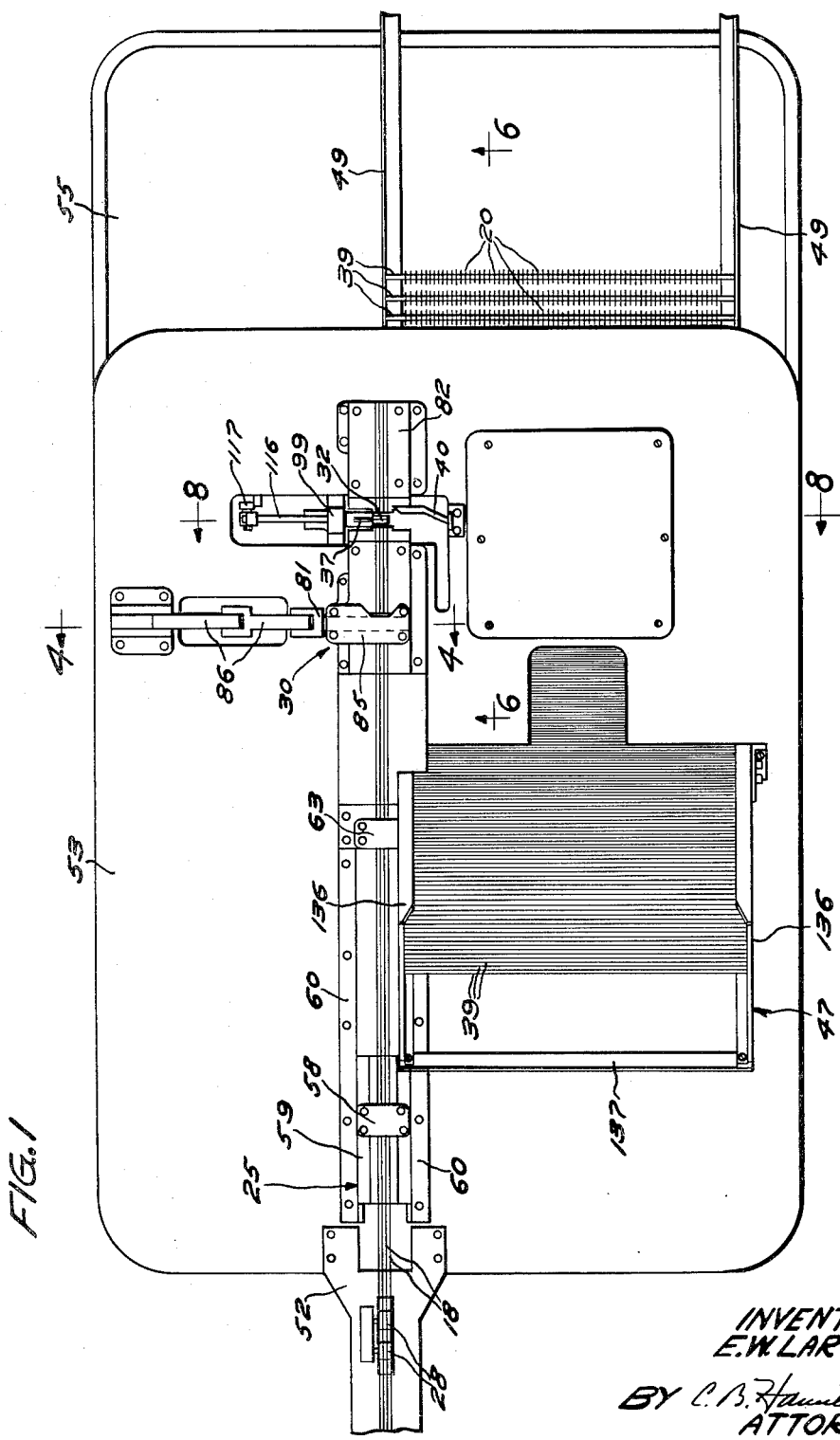

Referring to the drawings, particularly FIG. 7, the present apparatus is designed to sever successive sections 18 from supplies of wire 19 and form them into articles 20 having a substantially circular loop 21 and a pair of straight legs 22 extending from the loop in parallel and closely positioned relation to each other. Generally, the apparatus comprises a hitch feed 25 (FIGS. 1 and 2) for intermittently pulling the wires 19 through straightening rolls 28 and advancing the forward ends of the wires past a wire cutting means 30 (FIGS. 3 and 4) to position the end portions below an arbor 32 (FIG. 12) and above a pair of bending dies 34 and 35. Mechanism is provided for actuating the cutting means 30 to sever the sections 18 from the wires 19, for moving the arbor 34 downwardly to bend the wire sections into a U-shape between the spaced bending dies 34 and 35, and for moving the bending dies toward each other to further bend the wires around the arbor and move the legs 22 thereof into close proximity to each other. An ejector sleeve 37 slidable on the arbor is then actuated to eject the formed wire articles 20 from the arbor onto a rod 39 supported in alignment with the arbor.

The rod 39 serves as portable storage or magazine element for receiving and holding a predetermined number of the articles 20 thereon and as the articles are moved along the rod 39, they are deflected by a member 40 and caused to rotate through one-half revolution about the rod 39 and be suspended therefrom as shown in dotted lines in FIG. 6. Successive rods 39 are engaged at one end by a rotatable carrier 42 (FIGS. 3 and 8) which has a plurality of peripheral slots 43 for receiving the rods therein and which cooperates with a clamping member 44 to grip a rod and hold it firmly in position at the article-ejecting station 45 while the articles 20 are ejected thereonto. The carrier 42 receives the rods 39 from a gravity-type hopper 47 and carries them to the ejecting station and carries full rods 39 with articles 20 thereon from the ejecting station onto a storage rack 49 for temporarily storing them.

As seen in FIGS. 1 and 2, the straightening rollers 28 are carried by a bracket 52 which is secured to a horizontally disposed frame plate 53 which in turn is supported by a plurality of legs 54 extending upwardly from a base 55. The straightened wires 18 are gripped between pivoted gripping pawls 57 and a jaw 58 fixedly mounted on a slide 59 of the wire feed 25, the slide being mounted for reciprocation in a slideway formed in a member 60 mounted on the frame plate 53. Advanced portions of the wires 18 are gripped between pivoted gripping pawls 62 and a jaw 63 stationarily mounted on the member 60. The slide 59 is intermittently reciprocated through a predetermined distance to advance the wires through successive increments of predetermined length by means including an actuating arm 65 having a slotted end engageable with a roller 66 on the slide 59. The arm 65 is supported on a stationary pivot 67 and is oscillated through a predetermined arc by a crank arm 68 which is mounted on a shaft 69 journaled in a gear housing 70 secured to the frame plate 53. A chain and sprocket connection 72 connects the shaft 69 to a main drive shaft 73 which is driven through a chain and sprocket connection 74 to the shaft of a gear-reducer unit 75 which is driven from a motor 76.

As the wires 18 are advanced, they pass through apertures 78 in a cut-off bar 79 (FIGS. 4, 11 and 12) of the wire cutting means 30 and are supported in grooves 80 in wire guide members 81 and 82 on the frame plate 53 and in grooves 83 in the bending dies 34 and 35. The grooves 83 extend downwardly along the sides of the bending dies 34 and 35. The cut-off bar 79 is actuated through a toggle linkage 86 (FIG. 4) by a cam 91 on a shaft 92 which is supported in bearings 93 secured to the frame plate 53 and is driven through a sprocket and chain connection 94 (FIG. 2) from the main drive shaft 73. In response to actuation thereof, cut-off bar 79 cooperates with cutting edges on the member 81 to shear sections 18 from the wires which sections 18 are supported in the grooves 80 and 83 in a position above the bending dies 34 and 35 and below the arbor 32 as shown in FIG. 12.

The arbor 32 is mounted on the upper end of a slide 99 (FIGS. 6, 8, 11 and 12) which is vertically slidable on a pair of guides 100 extending between the frame plate 53 and the base 55. A cam follower 101 on the slide 99 rides in a groove of a cam 102 which is secured to the main drive shaft 73 and reciprocates the arbor 32 from its normal raised position as shown in full lines in FIG. 12 to its lower position indicated in dotted lines in the same figure. The bending dies 34 and 35 are carried by rods 104 mounted for horizontal reciprocation in guide members 105 on the frame plate 53 and are urged by springs 106 in opposite directions away from each other to their normal open or separated position. These bending dies are moved toward each other to closed position by levers 107 which are supported on brackets 108 for pivotal movement about pins 109 and are actuated by cams 110 on the main drive shaft 73.

Extending vertically upwardly from the arbor 32 is a thin spacer plate 112 (FIGS. 8, 11 and 12) for positioning the legs 22 of the wire article in parallel and separated relation to each other during the article forming operation. The ejector sleeve 37, telescopingly mounted on the arbor 32, has a pair of upwardly extending plates 114 on opposite sides of the spacer plate 112 for engaging the legs 22 of the article 20 to aid in ejecting the articles. A depending lug 115 formed on the ejecting sleeve 37 (FIGS. 8 and 12) is secured to a rod 116 which is supported on the slide 99 for vertical reciprocation therewith and for horizontal reciprocation relative thereto. At its rear end the rod 116 has a roller 117 engageable in a slot in the upper end of an actuating lever 118 when the arbor 32 is in its lower position as shown in FIG. 8. The lever 118 is supported on a fixed pivot 119 and has a pair of cam followers 120 cooperable with a pair of cams 121 fixedly mounted on the shaft 73 for imparting reciprocation to the ejecting member 37. As the slide 99 is raised, the roller 117 moves upwardly out of the slotted end of the lever 118 and engages a vertical bar 122 which holds the roller and the ejector sleeve 37 in retracted position while the roller is disengaged from the lever 118.

From the description thus far, it will be seen that with the apparatus operating, the wires 19 are advanced through successive increments of predetermined length to position end portions of the wires at the forming station between the arbor 32 and the bending dies 34 and 35, the cutter means 30 sever end sections 18 from the wires, the arbor moves down and bends the wires into U-shape between the dies 34 and 35, the dies 34 and 35 move toward each other to further bend the wires around the arbor with the legs 22 in close proximity to each other, and the four sets of wire articles 20 are ejected from the arbor onto the rod 39 by the ejector 37 with the loop 21 of the article threaded onto the rod 39. As the wire articles 20 move off of the arbor and along the rod 39 during the ejecting thereof, the upwardly directed legs 22 engage the obliquely disposed portion of the member 40 and are deflected thereby and caused to rotate about the rod 39 through 180° and come to a position of rest suspended from the rod. The deflector member 40 is mounted on the frame plate 53 which also has an opening 123 (FIG. 1) providing clearance for the articles 20 as they rotate to their lower position.

As disclosed in FIGS. 3 and 8, the rotatable carrier 42 for moving the rods 39 from the hopper 47 to the article-ejecting station and then to the storage rack 49, is in the form of a wheel having a cylindrical rim 124 in which the axially directed grooves 43 are formed in a predetermined circumferentially spaced relation to each other. An axle 126 on a stationary bracket 127 supports the carrier 42.

The rod clamping member 44 which cooperates with the carrier 42 to grip one end of the rod 39 and support it in the article-ejecting station in alignment with the arbor 32, is positioned above the carrier 42 and below the frame plate 53 and has a cylindrical lower surface concentric with the carrier 42 and in close proximity with the periphery thereof. A pair of pins 130 and a headed screw 131 depending from the frame plate 53 guide the clamping member 44 for limited vertical movement, and a spring 132 (FIG. 5) urges the member 44 downwardly to clamp the rod 39 against the carrier 42 and hold the rod in a horizontal position. In the carrier 42, the rod receiving grooves 39 adjacent to and on opposite sides of the groove at the ejecting station 45, as viewed in FIG. 3, are aligned with the lower end of the hopper 47, and the end of the rack 49 whereby in response to indexing of the carrier 42 a rod 39 is moved from the hopper 47 to the article-ejecting station 45, and a loaded rod 39 with articles 20 thereon is moved from the ejecting station to the rack 49. A pair of blocks 133 and 134 are stationarily mounted on the underneath side of the plate 53 on opposite sides of the clamping member 44 and are provided with cylindrical surfaces 135 concentric and in close proximity to the periphery of the carrier 42 for cooperating with the clamping member 44 to engage the rods 39 and maintain them in the recesses 43 during their movement from the hopper 47 to the article-ejecting station 45 and to the rack 49.

The hopper 47 comprises a pair of inclined channel members 136 suitably secured to the frame plate 53 and extending through an opening therein and with their upper ends secured to a cross member 137. The rods 39 are arranged in a row by the hopper and are urged by gravity toward the discharge outlet thereof with the endmost rod 39 engaging the carrier and dropping from the hopper into a groove 43 of the carrier as the groove 43 comes into registration with the end of the hopper.

As seen in FIGS. 6 and 8, a pair of curved guide members or tracks 139 are stationarily mounted on the underside of the guide members 105 for engaging and supporting the ends of the rods remote from the carrier 42 during a portion of the movement of the rods from the hopper 47 to the article-ejecting station 45 and from the station 45 to the storage rack 49. This rack comprises a pair of spaced parallel angle members supported on suitable frame members 139 (FIG. 3) in a position sloping slightly from the horizontal and with the ends of their horizontally disposed flanges 140 positioned in close proximity to a rod 39 as it is disengaged by the block 137.

A pair of pusher bars 142 (FIGS. 3 and 9) are provided for pushing the rods 39 a predetermined distance onto the rack 49 to provide clearance on the end of the rack for movement of the following rod 39 thereonto. These pusher bars 142 are secured to a shaft 143 which is oscillatably supported in a pair of brackets 144 mounted on the base 55. One of the pusher bars 142 is positioned adjacent the carrier 42 for engagement with a plurality of rollers 145 which are mounted on the carrier and serve to actuate the pusher bars 142 in one direction for transferring the rod 39 onto the rack. A coil spring 146 on the shaft 143 operates to return the pusher bars.

Means are provided for indexing the carrier 42 after a predetermined number of wire articles 20 have been ejected onto the rod 39 at the ejecting station 45. This indexing means includes a sprocket 150 (FIGS. 3 and 8) secured to the carrier 42 and connected through a chain 151 to a sprocket 152 on a shaft 153. This shaft 153 is journaled in bearings 154 (FIG. 9) and has a disc 155 secured to one end thereof on which are mounted a plurality of rollers 156, corresponding to the number of grooves in the carrier 42. The roller 156 engages a helical cam 157 for rotating the shaft 153 and indexing the carrier one increment for each rotation of the helical cam on an auxiliary drive shaft 158.

The shaft 158 is supported in coaxial alignment with the main drive shaft 73 and is driven at predetermined intervals in timed relation thereto through a one-revolution clutch 160 (FIGS. 6 and 10). One end of the shaft 158 is connected to a driven component 161 of the clutch 160, the driving component 162 of which is secured to the main drive shaft 73 for rotation therewith. A latch 164 pivotally supported on a bracket 165 has a normal position for actuating a clutch element 166 to disengage the clutch and hold it in such position. A revolving trip element 167 mounted on a shaft 168 of gear reducer 169, trips the latch 164 at predetermined intervals to effect the engagement of the clutch 161 and the indexing of the carrier 42. The gear reducer 169 is driven through a sprocket and chain connection 170 from the main drive shaft 73.

Thus, in response to a predetermined number of revolutions of the main drive shaft 73 and the ejection of a predetermined number of wire articles 20 onto a rod 39 at the ejecting station, the trip element 167 is rotated through one revolution to trip the clutch 161 and effect the indexing rotation of the shaft 158 through one revolution and the indexing of the carrier 42 through one step to carry a rod 39 from the hopper 47 into the article-ejecting station 45, to carry a rod 39 loaded with articles 20 thereon from the article-ejecting station 45 into engagement with the rack 49, and to actuate the pusher bars 142 to transfer a rod 39 with articles thereon from the carrier 42 onto the rack 49. As successive rods 39 with articles 20 thereon are transferred from the carrier onto the gently sloping storage rack 49 by the pusher bars 142, they engage the previously transferred rods and push them progressively down the rack. At intervals, as required, the rods 39, loaded with articles, may be removed from the rack.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for forming articles and ejecting them onto rods at a predetermined station, the combination of a hopper for supporting a supply of the rods and releasing them one at a time, a carrier engageable with only an end portion of successive rods and having portions for preventing the release of the rods from the hopper and having grooves for receiving said rods individually therein, means for intermittently moving the carrier through a predetermined path to receive successive rods from the hopper and advance them to and from the ejecting station, and stationary means cooperable with said carrier for holding said rod on said carrier for movement therewith through a predetermined distance and for holding said rod in a predetermined position at the ejecting station with a major portion of the rod projecting from the carrier for receiving the ejected articles thereon.

2. In an apparatus for forming articles and ejecting them onto rods at a predetermined station, the combination of a hopper for supporting a supply of the rods and releasing them one at a time, a carrier engageable with an end portion only of successive rods and having portions for preventing the release of the rods from the hopper and having grooves for receiving said rods individually therein, means for intermittently moving the carrier through a predetermined path to receive successive rods from the hopper and advance them to and from the ejecting station, stationary means cooperable with said carrier for holding said rod on said carrier for movement therewith through a predetermined distance and for holding said rod in a predetermined position at the ejecting station with a major portion of the rod projecting from the carrier for receiving the ejected articles thereon, and means mounted in the path of movement of the rods on the carrier on which the articles are loaded and operable in response to actuation of the carrier for removing said loaded rods from the carrier.

3. In an apparatus for forming articles and ejecting them at a station onto a rod; a hopper for holding a supply of the rods and releasing them one at a time; a cylindrical carrier having peripheral portions for preventing the release of the rods from the hopper and having axially directed peripheral grooves each engageable with one end portion only of a rod for receiving the rods therein in parallel and spaced relation to each other with major portions of the rods projecting from the carrier; means for indexing the carrier to locate a groove in a first position for receiving a rod from the hopper, to locate a second groove with a rod therein in said station for receiving the articles ejected thereat, and to locate a third groove with a rod therein having the ejected articles thereon in a third position; stationary means cooperable with the cylindrical carrier for holding the rods in the grooves in fixed and parallel relation to each other during the movement of the rods from the first position to the third position, a storage rack mounted adjacent the third position for receiving the rods with the articles thereon; and means responsive to the actuation of the carrier for transferring the rods from the carrier onto the rack.

4. In an apparatus for forming looped-shaped articles and ejecting them at a predetermined station, a plurality of rods for supporting said articles, a cylindrical carrier having axially directed peripheral grooves for receiving said rods therein, means for holding a supply of said rods and feeding successive rods into said grooves of said carrier with only an end portion of each of said rods in engagement with said carrier, stationary means cooperable with the carrier for releasably clamping said rods to said carrier for movement therewith through a predetermined distance and with the major portions of the rods projecting from said carrier, and drive means for indexing the carrier to move successive rods from said supply thereof into said article-ejecting station to receive a predetermined number of ejected articles thereon and for moving the rods with the articles thereon from said station.

5. In an apparatus for forming wires into looped-shaped articles and ejecting them at a predetermined station, a plurality of rods for receiving the looped-shaped articles, a carrier positioned to engage an end portion of successive rods for moving the rods in parallel and spaced relation to each other and with the major portions of the rods extending from the carrier, stationary means cooperable with the carrier for holding the rods firmly thereon for movement therewith through a predetermined distance, means for indexing said carrier to advance successive rods to said station to receive the ejected articles thereon and for moving said rods with the articles thereon from said station, means for storing a plurality of the rods with the articles thereon, and means actuated by the carrier for transferring the rods with the articles thereon from said carrier onto said storage means.

6. In an apparatus for forming looped-shaped articles and ejecting them along an axis, a plurality of rods for supporting the ejected articles, a hopper for holding a supply of said rods and releasing them one at a time, a carrier having a plurality of parallel grooves engageable with one end portion only of successive rods as they are released from said hopper, means for indexing said carrier to advance said rods from said hopper into alignment with said axis for receiving a plurality of the ejected articles thereon and to advance said rods with the articles thereon from said axis to a transfer station, stationary means cooperable with the carrier for holding the rods in the grooves in fixed and parallel relation to each other during the movement of the rods from said hopper to said transfer station, a pair of stationary parallel substantially horizontal storage members disposed in close proximity to and in lateral alignment with the end portions of a rod in said transfer station, transfer means including a pair of arms mounted for movement into engagement with the end portions of said rod in said transfer station, and means on said carrier for actuating said transfer means to cause said arms to transfer said loaded rod from said carrier onto said storage members.

References Cited in the file of this patent

UNITED STATES PATENTS

| | | |
|---|---|---|
| 1,448,829 | Clinton | Mar. 20, 1923 |
| 2,432,339 | Reynolds | Dec. 9, 1947 |
| 2,486,450 | Wahl | Nov. 1, 1949 |
| 2,613,861 | Goerlitz | Oct. 14, 1952 |
| 2,633,876 | Gasser et al. | Apr. 7, 1953 |
| 2,634,576 | Seibel | Apr. 14, 1953 |
| 2,674,755 | Schlicksupp | Apr. 13, 1954 |
| 2,712,835 | Sampatacos et al. | July 12, 1955 |
| 2,813,498 | Senzani | Nov. 19, 1957 |